Patented June 25, 1946

2,402,589

UNITED STATES PATENT OFFICE 2,402,589

CHEMICAL COMPOUNDS AND PROCESSES

Herrick R. Arnold, Brandywine Hundred, Del., assignor to E. I. du Pont de Nemours & Company, Wilmington, Del., a corporation of Delaware No Drawing. Application March 28, 1945, Serial No. 585,394

5 Claims. (Cl. 260—607)

This invention relates to new organoboron compounds and methods for preparing the same and more particularly to new halovinylboron compounds having the general formula

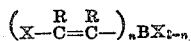

wherein X stands for a halogen atom selected from the group consisting of chlorine and bromine, R represents a member of the group consisting of hydrogen and monovalent hydrocarbon radicals, and at least one R stands for hydrogen, and $n$ stands for an integer having a value from 1 to 3.

This invention has as an object the preparation of novel and useful organoboron compounds. A further object is to prepare these new compounds by simple economical processes which give high yields of readily purified products. A still further object is to use these new organoboron compounds as intermediates in the preparation of various products which have many diverse technical applications. Other objects will appear hereinafter.

These objects are accomplished in accordance with the present invention by passing gaseous mixtures of boron chloride or bromide and a terminal acetylenic compound through reaction chambers where they are caused to combine to yield new halovinylboron compounds.

The following example illustrates but does not limit this invention.

A catalytic converter tube made of glass or other material capable of withstanding the action of boron chloride is packed with a granular catalyst consisting of mercurous chloride supported on active carbon. The catalyst is prepared by impregnating a granular active carbon with 180 grams of mercuric chloride per liter of carbon and reducing it to mercurous chloride by allowing it to soak for 16 hours in a saturated aqueous solution of sulfur dioxide followed by drying in a vacuum at 100° C. The tube is surrounded by an electrically heated jacket. The inlet end of the tube is connected to lines supplying vaporized boron trichloride and acetylene. The exit end of the tube is connected in series to a receiver cooled in ice water and a second receiver cooled in a mixture of solidified carbon dioxide and acetone.

Air and moisture are removed from the converter by passing through it a stream of dry nitrogen while it is heated up to a temperature of 150° C. When the temperature has reached 150° C., streams of vaporized boron trichloride and acetylene are metered into the inlet end of the converter in a molar ratio of boron trichloride to acetylene of about 1.5 to 1, the rate of flow being adjusted to the volume of catalyst so as to obtain a time of contact of about 8 to 12 seconds. The initial reaction is exothermic, and the temperature may rise to as much as 300° C. External heating is discontinued while the temperature of the external surface of the reaction tube is above 150° C. As the process is continued the temperature within the catalyst bed gradually decreases and at the same time the activity of the catalyst falls off somewhat. After running for six hours, however, the degree of conversion of the reactants to chlorovinylboron dichloride is still high, and even at the end of eighteen hours conversion is substantial.

The product which has condensed in the cooled receivers is a nearly colorless liquid mixture consisting of unconverted boron trichloride in admixture with the principal product, chlorovinylboron dichloride and lesser amounts of bis-chlorovinyl boron chloride and tris-chlorovinylborine. This mixture is separated by fractional distillation, first at atmospheric pressure until most of the boron trichloride has distilled, and finally at 50 mm. pressure to obtain chlorovinylboron dichloride. The relatively nonvolatile still residue consists primarily of bis-chlorovinylboron chloride along with lesser amounts of tris-chlorovinylborine. Both the recovered boron trichloride and unconverted acetylene which pass through the receivers may be recycled through the converter in order to obtain high overall conversion. In a typical operation over a period of six hours the conversion of boron trichloride to chlorovinylborine dichloride was 35%, and the yield based on boron trichloride not recovered was 87%. Over an 18 hour period the conversion drops somewhat to about 25% with a corresponding yield of about 75%. The reaction of boron trichloride and acetylene to yield chlorovinylboron dichloride is represented by the following equation:

Chlorovinylboron dichloride is a colorless fuming liquid which boils at 99° C. at atmospheric pressure with slight decomposition. At 50 mm. pressure it boils at 28° C. It has a density of 1.33 at 25° C. It is soluble in benzene and other hydrocarbons, chloroform and carbon tetrachloride. By reaction with water or alcohols it may be converted into chlorovinylboronic acid and esters of this acid, respectively.

The above example represents a preferred embodiment of this invention. However, instead of acetylene itself homologues and substituted acetylenes may be employed to obtain substituted chlorovinylboron halides. As examples of other terminal acetylenic compounds may be mentioned methylacetylene, ethylacetylene, monovinylacetylene, and phenylacetylene. Instead of using boron trichloride, boron tribromide may be employed to yield the corresponding bromovinylboron dibromides. Chlorovinylboron dibromide may be obtained by reacting chlorovinylboron dichloride with anhydrous hydrogen bromide.

Mercurous chloride on active carbon is the preferred catalyst for use in this invention. However, other catalysts may be employed, for example, mercuric chloride, and the catalyst may be supported on other solid materials that will withstand the reaction of boron halides instead of carbon. While temperatures in the range of 150 to 300° C. are preferred, other temperatures may be employed, but in the lower ranges the degree of conversion is lower and in the higher ranges decomposition to tarry products tends to become greater. Obviously other ratios of the reactants described above may be employed. A high ratio of acetylene to boron trichloride tends to increase the formation of bis-chlorovinylboron monochloride and tris-chlorovinylborine. Likewise, the time of contact may be varied as convenient. Generally, the conversion increases and the yield decreases at much longer times of contact than shown above, and the converse is the case at much shorter times of contact.

This invention provides a novel and economical process for obtaining chlorovinylboron dichloride which can readily be converted to chlorovinylboronic acid and esters of this acid. Such derivatives have many diverse technical applications in the fields of polymer modifiers, fungicides and synthesis reactions.

As can be seen from the above discussion, the new compounds of this invention are of the general formula $(XC_2HR)_nBX_{3-n}$ wherein X is chlorine or bromine, R is hydrogen or a monovalent hydrocarbon radical, and $n$ stands for one of the numerals 1, 2 and 3. The monovalent $XC_2HR$ radical is ethylenically unsaturated. When R is a hydrocarbon radical, it is preferably an acyclic hydrocarbon radical containing not more than four carbon atoms and more usually an alkyl group. These products are mono-, bis- and tris-beta-halovinyl derivatives of boron having any remaining boron valencies satisfied by chlorine or bromine. Thus, when $n$ is 1, the compounds, are boron derivatives having $BX_2$ on one ethylenically linked carbon atom, X on the other ethylenically linked carbon, a hydrogen atom on one of said carbon atoms and a hydrogen atom or a monovalent hydrocarbon radical on the other of said carbon atoms.

As many apparently widely different embodiments of this invention may be made without departing from the spirit and scope thereof, it is to be understood that I do not limit myself to the specific embodiments thereof except as defined in the appended claims.

I claim:

1. New halovinylboron compounds having the general formula

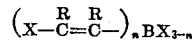

wherein X stands for a halogen selected from the group consisting of chlorine and bromine, R represents a member of the group consisting of hydrogen and monovalent hydrocarbon radicals and at least one R stands for hydrogen, and $n$ stands for an integer having a value from 1 to 3.

2. A process for preparing new halovinylboron compounds having the general formula set forth in claim 1 which comprises causing the addition of a boron trihalide selected from the group consisting of boron trichloride and boron tribromide to a terminal acetylenic compound having the general formula

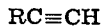

wherein R represents a member of the group consisting of hydrogen and monovalent hydrocarbon radicals.

3. New halovinylboron dihalides having the general formula

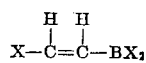

wherein X stands for a halogen atom selected from the group consisting of chlorine and bromine.

4. Chlorovinyl boron dichloride.

5. A process for preparing chlorovinylboron dichloride which comprises passing a mixture of acetylene and boron trichloride into contact with a mercury chloride catalyst.

HERRICK R. ARNOLD.